(12) United States Patent
Sinha et al.

(10) Patent No.: US 12,137,402 B2
(45) Date of Patent: Nov. 5, 2024

(54) METHOD AND UE FOR IDENTIFYING OPTIMAL NUMBER OF PATHS BETWEEN RFIC AND PLURALITY OF SIMS

(71) Applicant: Samsung Electronics Co., Ltd., Suwon-si (KR)

(72) Inventors: Kumud Kumar Sinha, Bangalore (IN); Lalit Kumar Pathak, Bangalore (IN); Tushar Vrind, Bangalore (IN); Mohanraja Balasubramaniam, Bangalore (IN); Debabrata Das, Bangalore (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 512 days.

(21) Appl. No.: 17/388,548

(22) Filed: Jul. 29, 2021

(65) Prior Publication Data
US 2022/0038987 A1 Feb. 3, 2022

(30) Foreign Application Priority Data
Jul. 29, 2020 (IN) .............................. 202041032585

(51) Int. Cl.
*H04L 47/24* (2022.01)
*H04W 8/18* (2009.01)
(Continued)

(52) U.S. Cl.
CPC ............. *H04W 40/04* (2013.01); *H04W 8/18* (2013.01); *H04W 24/08* (2013.01); *H04W 48/10* (2013.01); *H04W 76/28* (2018.02); *H04W 88/06* (2013.01)

(58) Field of Classification Search
CPC ....... H04W 40/04; H04W 76/28; H04W 8/18; H04W 24/08; H04W 48/10; H04W 88/06;
(Continued)

(56) References Cited

U.S. PATENT DOCUMENTS 9,094,918 B2  7/2015  Bhogaraju et al.
9,705,555 B2  7/2017  Ezekiel et al.
(Continued)

FOREIGN PATENT DOCUMENTS

CN  105517076 A  *  4/2016
CN  105764124 A     7/2016
KR  20220105314 A  *  7/2022

OTHER PUBLICATIONS

Kumud Sinha, Tushar Vrind, Lalit Pathak, Debabrata Das "Novel System Design for Reducing Cost and Power Consumption in a Multi-SIM User Equipment", IEEE CCNC, 2020.
(Continued)

*Primary Examiner* — Kashif Siddiqui
(74) *Attorney, Agent, or Firm* — Harness, Dickey & Pierce, P.L.C.

(57) ABSTRACT

A method for determining a number of paths between a Radio Frequency Integrated Circuit (RFIC) and a plurality of Subscriber Identity Modules (SIMS) of a User Equipment (UE), the plurality of SIMS including a primary SIM and a secondary SIM, the method including detecting, by the UE, at least one event associated with the secondary SIM, determining, by the UE, a tune away duration associated with the primary SIM based on the at least one event associated with the secondary SIM, determining, by the UE, an amount of resource loss by the primary SIM and a data throughput reduction of the primary SIM based on the tune away duration, and determining, by the UE, the number of paths between the RFIC and the plurality of SIMS based on the amount of resource loss by the primary SIM and the data throughput reduction of the primary SIM.

20 Claims, 9 Drawing Sheets

(51) Int. Cl.
| | |
|---|---|
| *H04W 24/08* | (2009.01) |
| *H04W 40/04* | (2009.01) |
| *H04W 48/10* | (2009.01) |
| *H04W 76/28* | (2018.01) |
| *H04W 88/06* | (2009.01) |

(58) Field of Classification Search
CPC ..... H04W 48/12; H04W 48/18; H04W 8/183; H04L 47/245
See application file for complete search history.

(56) References Cited

U.S. PATENT DOCUMENTS

| | | | |
|---|---|---|---|
| 10,341,956 B2 | 7/2019 | Pu et al. | |
| 11,012,850 B1* | 5/2021 | Zhu | H04W 4/021 |
| 2014/0098694 A1 | 4/2014 | Damji et al. | |
| 2015/0092611 A1* | 4/2015 | Ponukumati | H04W 36/0022 |
| | | | 455/414.1 |
| 2015/0092708 A1 | 4/2015 | Su et al. | |
| 2018/0160422 A1* | 6/2018 | Pathak | H04W 76/10 |
| 2020/0204981 A1* | 6/2020 | Oh | |
| 2021/0168090 A1* | 6/2021 | Momchilov | |
| 2022/0116847 A1* | 4/2022 | Rangaraju | |
| 2023/0026600 A1* | 1/2023 | Xie | H04W 56/001 |

OTHER PUBLICATIONS

Lalit Pathak, Diwakar Sharma, Tushar Vrind, Debabrata Das "Protocol for Reduction in Network Resource Wastage for 4G DSDS User Equipment", IEEE CCNC, 2018.
Lalit Pathak, Tushar Vrind, Diwakar Sharma, Debabrata Das "Efficient Protocol for Performance Enhancement of B4G and 5G Networks for MultiSIM Deployment", IEEE CCNC, 2019.
H. L. Deepak, et al., "Dual SIM Dual Active Feature in a 3G Modem: A Comprehensive Survey", International Journal, IJERME, 2016.
Partha Chakraborty, etal, "Automated cost reduction while using multiple SIMs in a single mobile device", IEEE NSysS, 2017.
Qing Hu, etal, "Research and Design of Dual-Network Dual-Standby in Radio Interface Layer Based on Android", ICCSNT, 2011.
Imai, N., Yoshihara, K, "A Power-saving Standby Method to Extend Battery Life in Dual-mode Cellular Phones", IEEE CCNC, 2012.
G. Jung, etal, "Performance improvements of Universal Mobile Telecommunications System enhanced uplink using mitigation scheme in single Tx & dual Rx dual-SIM dual-active", Electronics Letters, 2015.
3GPP, "36.304: User Equipment (UE) procedures in idle mode", Release 15, 2019.
Samsung newsroom, "SK Telecom and Samsung Completed 4G-5G Network Dual Connectivity Test Achieving 2.7Gbps", 2019.
GSMA, "eSIM Whitepaper, The what and how of Remote SIM Provisioning", 2018.
Sinha, K. et al. "Novel System Design for Reducing Cost and Power Consumption in a Multi-SIM User Equipment ." *IEEE 17th Annual Consumer Communications & Networking Conference (CCNC)*, Jan. 2020, pp. 1-2 . https://doi.org/10.1109/CCNC46108.2020.9045345.

* cited by examiner

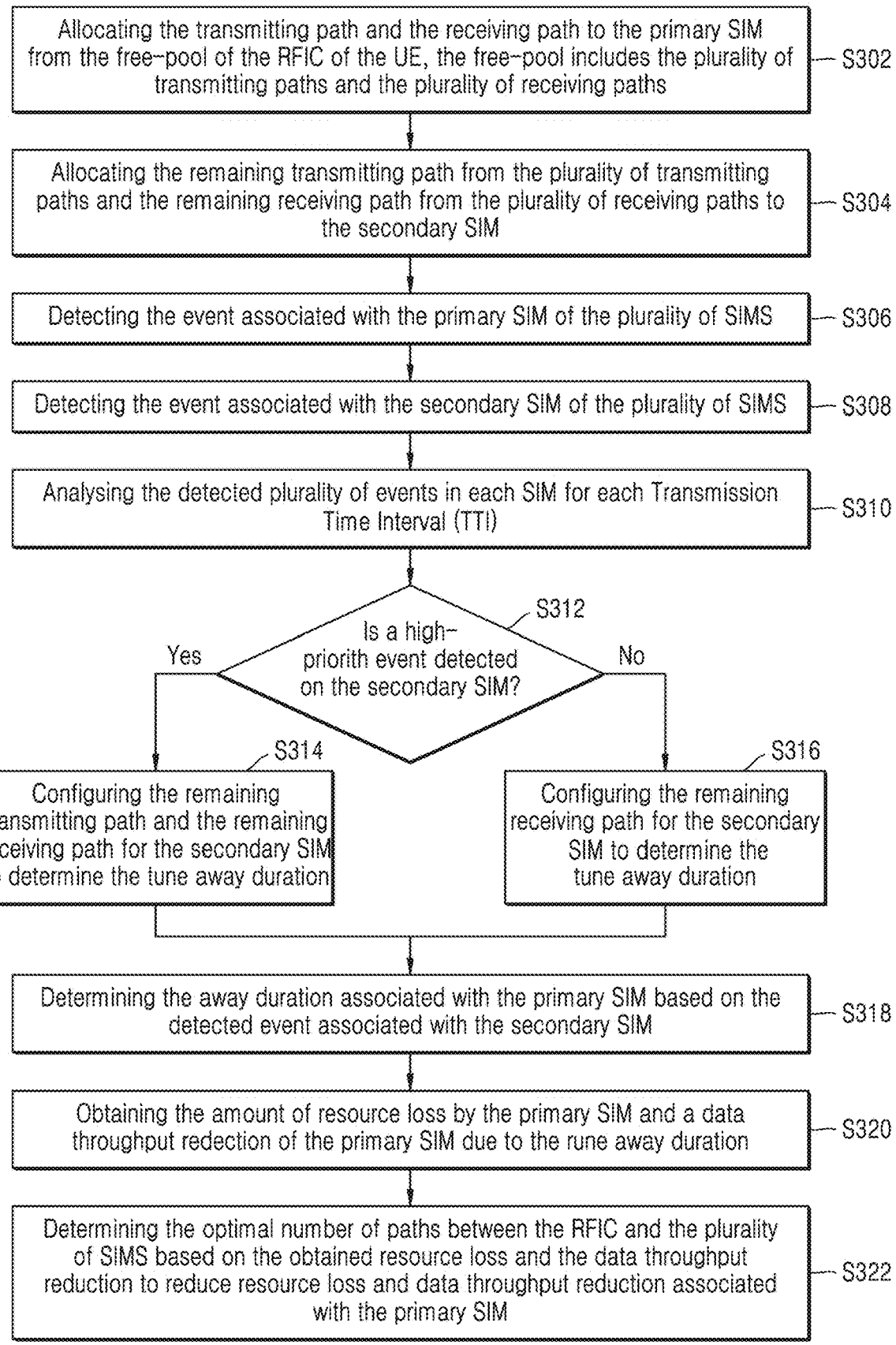

METHOD AND UE FOR IDENTIFYING OPTIMAL NUMBER OF PATHS BETWEEN RFIC AND PLURALITY OF SIMS

CROSS-REFERENCE TO RELATED APPLICATIONS

This application claims the benefit of Indian Provisional Patent Application No. 202041032585, filed on Jul. 29, 2020, in the Indian Intellectual Property Office, the disclosure of which is incorporated herein in its entirety by reference.

TECHNICAL FIELD

An example embodiment relates to wireless communication, and more specifically to a method and User Equipment (UE) for identifying an optimal (or more efficient) number of paths between a Radio Frequency Integrated Circuit (RFIC) and a plurality of Subscriber Identity Modules (SIMS) to reduce costs and/or power consumption of a Multi-SIM UE.

BACKGROUND

In general, a Dual SIM Dual Standby (DSDS) UE supports two SIMs to be associated with two separate operators. A System on Chip (SoC) and a RFIC of the UE implements a single instance of a receiver (Rx) path and a transmitter (Tx) path to save space, costs, and power consumption associated with the UE. Furthermore, the Rx and Tx paths are shared by Protocol Software Stacks (PSS) that correspond to each SIM. A similar concept applies to Multi-SIM Multi Standby (MSMS), three or more SIMs. Nowadays, new operators are entering to $5^{th}$ Generation (5G) markets and Narrowband Internet of Things (NB-IoT) markets. As a result, an increase in demand for Multi-SIM UEs is anticipated, allowing consumers/users to try out new offerings from various operators. Furthermore, arrival of an embedded SIM (eSIM) has increased the ability for users to have a Multi-SIM experience.

A tune away operation occurs while the Rx and Tx paths of a SIM-1 (e.g., the primary active SIM of the UE) are shared with one of the other SIMs (e.g., a secondary standby SIM of the UE). In an example, when the SIM-1 is used for an ongoing data session with an Operator-1, one of the other SIMs is to complete a higher priority operation with its corresponding operator. As a result, the Rx or Tx paths from the SIM-1 are assigned to the other secondary SIM, putting the SIM-1 into a standby mode. As the Rx/Tx path is taken away, there is no response from the SIM-1, which will result in wastage of a Physical Channel Resource (PCR) allocated at the Operator-1. In addition to the PCR-wastage (loss), data throughput as experienced by the SIM-1 also degrades, as there is no Uplink (UL) or Downlink (DL) activity possible during the tune away operation.

In $3^{rd}$ Generation Partnership Project (3GPP) standard, existing mechanisms have initiated a study on enablers for the Multi-SIM UE in a New Radio (5G), considering both one Rx path with one Tx path, as well as two Rx path with one Tx path. Furthermore, the existing mechanisms study a challenge of PCR wastage in both DSDS and MSMS UEs, with a single RFIC and present an Access Stratum (AS) and Non-Access Stratum (NAS) based signaling and feedback solution to address the challenge. But the existing mechanisms do not analyze an effect of more than one Rx or more than one Tx paths in a design of the UE. Furthermore, some of the existing methods/mechanisms analyze dual Rx and single Tx path design, which may be applicable for the DSDS UE, but in an absence of a proposed analytical framework, which is not extendable to a case when there are three or more SIMs (MSMS/Multi-SIM UE).

Thus, it would be desirable to have at least one useful alternative for selecting an optimal (or more efficient) number of Rx paths and Tx paths for the Multi-SIM UE in order to satisfy a complex design challenge and improve the efficiency and/or effectiveness of the Multi-SIM UE (e.g., power consumption, performance, area, and/or cost (Optimal-PPAC)).

SUMMARY

According to an example embodiment, an optimal (or more efficient) number of Rx paths and Tx paths may be selected for a Multi-SIM UE in order to satisfy a complex design challenge and improve the efficiency and/or effectiveness of the Multi-SIM UE. For example, an example embodiment may provide for reducing a PCR wastage associated with a primary SIM during a tune away operation, improving an operation performance, saving an area/cost in a SoC and a RFIC, and/or reducing a power consumption of the UE/Multi-SIM UE by selecting a right number of paths (e.g., an optimal, or more efficient, number of Rx paths and Tx paths).

According to an example embodiment, a transmitting path and a receiving path to the primary SIM is allocated from a free pool of the RFIC of the UE, the free pool includes a plurality of transmitting paths and a plurality of receiving paths and allocating one remaining transmitting path from the plurality of transmitting paths and one remaining receiving path from the plurality of receiving paths to a secondary SIM based on a priority of generated events associated with the least one secondary SIM.

According to an example embodiment, determinations are made regarding a tune away duration/operation associated with the primary SIM and a plurality of conditions when there is no available Rx/Tx path in the free pool (e.g., an RFIC pool) to handle an event at the secondary SIM.

According to an example embodiment, the PCR wastage and a data throughput degradation are determined across the primary SIM during the tune away duration. The PCR wastage and the data throughput degradation are within a threshold limit (design specific constraint parameter) to obtain the optimal (or more efficient) number of Rx paths and Tx paths for the Multi-SIM UE in order to satisfy the complex design challenge and improve the efficiency and/or effectiveness of the Multi-SIM UE.

According to an example embodiment, a determination is made regarding RFIC usage and dynamically turnoff and turn on RFIC to save battery power of the Multi-SIM UE.

Accordingly, an example embodiment herein provides a method for determining a number of paths between a Radio Frequency Integrated Circuit (RFIC) and a plurality of Subscriber Identity Modules (SIMS) of a User Equipment (UE), the plurality of SIMS including a primary SIM and at least one secondary SIM, the method including detecting, by the UE, at least one event associated with the at least one secondary SIM, determining, by the UE, a tune away duration associated with the primary SIM based on the at least one event associated with the at least one secondary SIM, determining, by the UE, an amount of resource loss by the primary SIM and a data throughput reduction of the primary SIM based on the tune away duration, and determining, by the UE, the number of paths between the RFIC and the plurality of SIMS based on the amount of resource loss by the primary SIM and the data throughput reduction of the primary SIM.

In an example embodiment, the method includes allocating, by the UE, a transmitting path and a receiving path to the primary SIM from a free pool of the RFIC of the UE, wherein the free pool comprises a plurality of transmitting paths and a plurality of receiving paths, and allocating, by the UE, at least one remaining transmitting path among the plurality of transmitting paths and at least one remaining receiving path among the plurality of receiving paths to the at least one secondary SIM.

In an example embodiment, the at least one event includes a Paging reception (P), a Measurement (MES), a System Information Block (SIB), or a Signaling (SIG).

In an example embodiment, the determining the tune away duration includes determining, by the UE, whether the at least one event includes a high-priority event, and performing, by the UE, one of configuring the at least one remaining transmitting path and the at least one remaining receiving path for the at least one secondary SIM to determine the tune away duration in response to determining the at least one event includes the high-priority event, or configuring the at least one remaining receiving path for the at least one secondary SIM to determine the tune away duration in response to determining that the at least one event does not include the high-priority event.

In an example embodiment, the at least one event includes a Paging reception (P), a Measurement (MES), a System Information Block (SIB), or a Signaling (SIG), the SIG is the high-priority event and uses an Uplink (UL) and a Downlink (DL) for message exchanges, and the P, the MES, and the SIB are not high-priority events and use the DL for message exchanges.

In an example embodiment, the configuring the at least one remaining transmitting path and the at least one remaining receiving path includes determining, by the UE, whether the at least one remaining transmitting path and the at least one remaining receiving path are available to allocate to the at least one secondary SIM, and performing, by the UE, one of allocating the transmitting path of the primary SIM to the at least one secondary SIM in response to determining the at least one remaining transmitting path is not available for the at least one secondary SIM, allocating the receiving path of the primary SIM to the at least one secondary SIM in response to determining the at least one remaining receiving path is not available for the at least one secondary SIM, allocating the at least one remaining transmitting path to the at least one secondary SIM in response to determining the at least one remaining transmitting path is available for the at least one secondary SIM, or allocating the at least one remaining receiving path to the at least one secondary SIM in response to determining the at least one remaining receiving path is available for the at least one secondary SIM.

In an example embodiment, the configuring the at least one remaining receiving path for the at least one secondary SIM includes determining, by the UE, whether the at least one remaining receiving path is available to allocate to the at least one secondary SIM, and performing, by the UE, one of allocating the receiving path of the primary SIM to the at least one secondary SIM in response to determining the at least one remaining receiving path is not available for the at least one secondary SIM, or allocating the at least one remaining receiving path to the at least one secondary SIM in response to determining the at least one remaining receiving path is available for the at least one secondary SIM.

In an example embodiment, the determining the at least one event includes generating, by the UE, a page event for each of the plurality of SIMS at every DRX cycle period to read a page message at paging-subframe, generating, by the UE, a measurement event for each of the plurality of SIMS at the DRX Cycle period, generating, by the UE, an MES event for each of the plurality of SIMS, performing, by the UE, a measurement at every DRX paging period in response to detecting a high speed of the UE, generating, by the UE, SIB events for each of the plurality of SIMS at a periodic SIB reading timer expiry, generating, by the UE, an SIB event at every cell boundary, or generating, by the UE, a SIG event at expiry of a periodic tracking area timer or in response to changing a tracking area.

In an example embodiment, the method further includes detecting a plurality of events for the plurality of SIMS, the plurality of events including the at least one event associated with the at least one secondary SIM and at least one event associated with the primary SIM, and the determining the amount of the resource loss by the primary SIM and the data throughput reduction of the primary SIM includes determining, by the UE, whether a value of an event duration associated with each of the plurality of events is greater than a value of a physical link monitor timer, and performing, by the UE, one of determining the amount of resource loss by the primary SIM and the data throughput reduction of the primary SIM by analyzing the plurality of events for each Transmission Time Interval (TTI) based on a Physical Channel Resource (PCR) allocation rate and the event duration associated with each of the plurality of events in response to determining the value of the event duration associated with each of the plurality of events is not greater than the value of the physical link monitor timer, or determining the amount of resource loss by the primary SIM and the data throughput reduction of the primary SIM by analyzing the plurality of events for each TTI based on the PCR allocation rate and the value of the physical link monitor timer in response to determining the value of the event duration associated with each of the plurality of events is greater than the value of the physical link monitor timer.

In an example embodiment, the method further includes determining, by the UE, a highest number of receiving paths and a highest number of transmitting paths for the at least one secondary SIM based on the amount of resource loss by the primary SIM and the data throughput reduction of the primary SIM, wherein the highest number of receiving paths and the highest number of transmitting paths comprise values less than a threshold limit.

In an example embodiment, the method further comprises detecting a plurality of events for the plurality of SIMS, the plurality of events including the at least one event associated with the at least one secondary SIM and at least one event associated with the primary SIM, and the plurality of events corresponding to a plurality of transmitting paths and a plurality of receiving paths, and the determining the number of paths between the RFIC and the plurality of SIMS includes obtaining, by the UE, a number of transmitting paths and a number of receiving paths based on a highest allowed PCR wastage combined with a first weight, and a highest allowed throughput degradation combined with a second weight, obtaining, by the UE, a combined metric of a respective amount of resource loss and a respective data throughput reduction for each combination of the plurality of transmitting paths and the plurality of receiving paths for at least one of the plurality of events, and determining, by the UE, the number of paths based on the combined metric, the number of transmitting paths and the number of receiving paths, the number of paths including one or more transmitting paths and one or more receiving paths.

In an example embodiment, the method further includes detecting a plurality of events for the plurality of SIMS, the plurality of events including the at least one event associated with the at least one secondary SIM and at least one event associated with the primary SIM, the at least one event associated with the primary SIM is active in a data session, and the at least one event associated with the at least one secondary SIM is at least one of an idle state, a periodic activity state, an aperiodic activity state, or a high-priority state to establish connectivity with at least one server.

Accordingly, an example embodiment herein provides the UE for determining a number of paths between a Radio Frequency Integrated Circuit (RFIC) and a plurality of Subscriber Identity Modules (SIMS), the plurality of SIMS including a primary SIM and at least one secondary SIM, the including a memory, and processing circuitry, configured to detect at least one event associated with the at least one secondary SIM, determine a tune away duration associated with the primary SIM based on the at least one event associated with the at least one secondary SIM, determining an amount of resource loss by the primary SIM and a data throughput reduction of the primary SIM based on the tune away duration, and determine the number of paths between the RFIC and the plurality of SIMS based on the amount of resource loss by the primary SIM and the data throughput reduction of the primary SIM.

According to an example embodiment, the number of paths includes one or more transmitting paths and one or more receiving paths, and the processing circuitry is configured to dynamically enable the one or more transmitting paths and the one or more receiving paths, and dynamically disable at least one other transmitting path or at least one other receiving path.

These and other aspects of an example embodiment herein will be better appreciated and understood when considered in conjunction with the following description and the accompanying drawings. It should be understood, however, that the following descriptions, while indicating specific examples and numerous specific details thereof, are given by way of illustration and not of limitation. Many changes and modifications may be made within the scope of an example embodiment herein without departing from the spirit thereof, and an example embodiment herein includes all such modifications.

BRIEF DESCRIPTION OF FIGURES

An example embodiment is illustrated in the accompanying drawings, throughout which like reference letters indicate corresponding parts in the various figures. An example embodiment herein will be better understood from the following description with reference to the drawings, in which:

FIG. 3 is a flow diagram illustrating a method for identifying the optimal (or more efficient) number of paths between the RFIC and the plurality of SIMS, according to an example embodiment as disclosed herein.

DETAILED DESCRIPTION

Figure 1A:
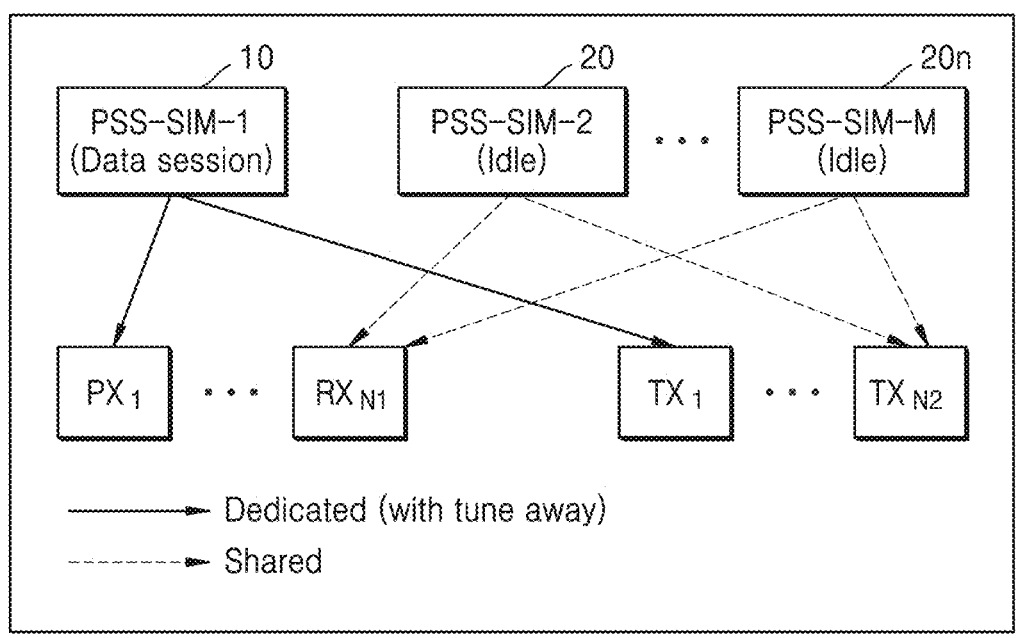
FIG. 1A illustrates an architectural diagram of a multi-SIM UE with multi Rx and Tx paths.

An example embodiment herein and the various features and advantageous details thereof are explained more fully with reference to the non-limiting examples that are illustrated in the accompanying drawings and detailed in the following description. Descriptions of well-known components and processing techniques are omitted so as to not unnecessarily obscure an example embodiment herein. Also, the various examples described herein are not necessarily mutually exclusive, as some examples may be combined with one or more other examples. The term "or" as used herein, refers to a non-exclusive or, unless otherwise indicated. The examples used herein are intended merely to facilitate an understanding of ways in which an example embodiment herein may be practiced and to further enable those skilled in the art to practice an example embodiment herein. Accordingly, the examples should not be construed as limiting the scope of an example embodiment herein.

As is traditional in the field, an example embodiment may be described and illustrated in terms of blocks which carry out a described function or functions. These blocks, which may be referred to herein as managers, units, modules, hardware components or the like, may be physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of an example embodiment may be physically separated into two or more interacting and discrete blocks without departing from the scope of the disclosure. Likewise, the blocks of an example embodiment may be physically combined into more complex blocks without departing from the scope of the disclosure.

The accompanying drawings are used to help easily understand various technical features and it should be understood that an example embodiment presented herein is not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, an example embodiment herein provides a method for identifying a number of paths between a RFIC and a plurality of SIMS of a UE. The method includes detecting, by the UE, an event associated with a primary SIM of the plurality of SIMS. Further, the method includes detecting, by the UE, an event associated with a secondary SIM of the plurality of SIMS. Further, the method includes determining, by the UE, a tune away duration associated with the primary SIM based on the detected event associated with the secondary SIM. Further, the method includes obtaining, by the UE, an amount of resource loss by the primary SIM and a data throughput reduction of the primary SIM due to the tune away duration. Further, the method includes determining, by the UE, the number of paths between the RFIC and the plurality of SIMS based on the obtained resource loss and the data throughput reduction.

Accordingly, an example embodiment herein provides the UE for identifying the number of paths between the RFIC and the plurality of SIMS. The UE includes an optimal path controller coupled with a processor and a memory. The optimal path controller is configured to detect an event associated with a primary SIM of the plurality of SIMS. Further, the optimal path controller is configured to detect an event associated with a secondary SIM of the plurality of SIMS. Further, the optimal path controller is configured to determine a tune away duration associated with the primary SIM based on the detected event associated with the secondary SIM. Further, the optimal path controller is configured to obtain an amount of resource loss by the primary SIM and a data throughput reduction of the primary SIM due to the tune away duration. Further, the optimal path controller is configured to determine the optimal number of paths between the RFIC and the plurality of SIMS based on the obtained resource loss and the data throughput reduction.

Unlike existing methods and systems, the proposed method allows the UE to select the optimal (e.g., more efficient) number of Rx paths and Tx paths for Multi-SIM UE in order to satisfy a complex design challenge and improve the efficiency and/or effectiveness of the Multi-SIM UE. For example, an example embodiment may provide for reducing a PCR-wastage associated with a primary SIM during a tune away operation, improving an operation performance, saving an area/cost in the SoC and the RFIC, and/or reducing a power consumption of the UE/Multi-SIM UE by selecting a right number of paths.

Unlike existing methods and systems, the proposed method allows the UE to allocate a Tx path and a Rx path to the primary SIM from a free pool of the RFIC of the UE, the free pool includes a plurality of Tx paths and a plurality of Rx paths and allocating remaining Tx path from the plurality of Tx paths and remaining Rx path from the plurality of Rx paths to the secondary SIM based on a priority of generated events associated with the least one secondary SIM.

Unlike existing methods and systems, the proposed method allows the UE to determine the tune away duration/ operation associated with the primary SIM and determine the plurality of conditions when there is no available Rx/Tx path in the free pool to handle the event at the least one secondary SIM.

Unlike existing methods and systems, the proposed method allows the UE to determine the PCR wastage and the data throughput degradation across the primary SIM during the tune away duration. The PCR wastage and the data throughput degradation are within a threshold limit (design specific constraint parameter) to obtain the optimal (e.g., more efficient) number of Rx paths and Tx paths for Multi-SIM UE in order to satisfy the complex design challenge and improve the efficiency and/or effectiveness of the Multi-SIM UE.

FIG. 1A illustrates an architectural diagram of a multi-SIM UE with multi Rx and Tx paths.

In the Multi-SIM UE, a primary SIM (10) is engaged in a data session, and secondary SIMs (20-20n) that are in an idle state are able to perform a periodic or aperiodic operation that is of higher priority to maintain contact with their respective network operator (e.g. server, eNodeB(eNB), gNB). These higher priority activities may lead to a tune away from the primary SIM (10) when the Rx or the Tx path is shared in the case of single Rx and single Tx paths in the RFIC used for a design of the UE and/or the Rx or the Tx path of the primary SIM (10), among Rx paths $Rx_1$ to $Rx_{N1}$ and Tx paths $Tx_1$ to $Tx_{N1}$, is shared with secondary SIMs (20-20n). There is an associated PSS for each SIM, which carries out the UE side procedures with the respective operator network.

Figure 1B:
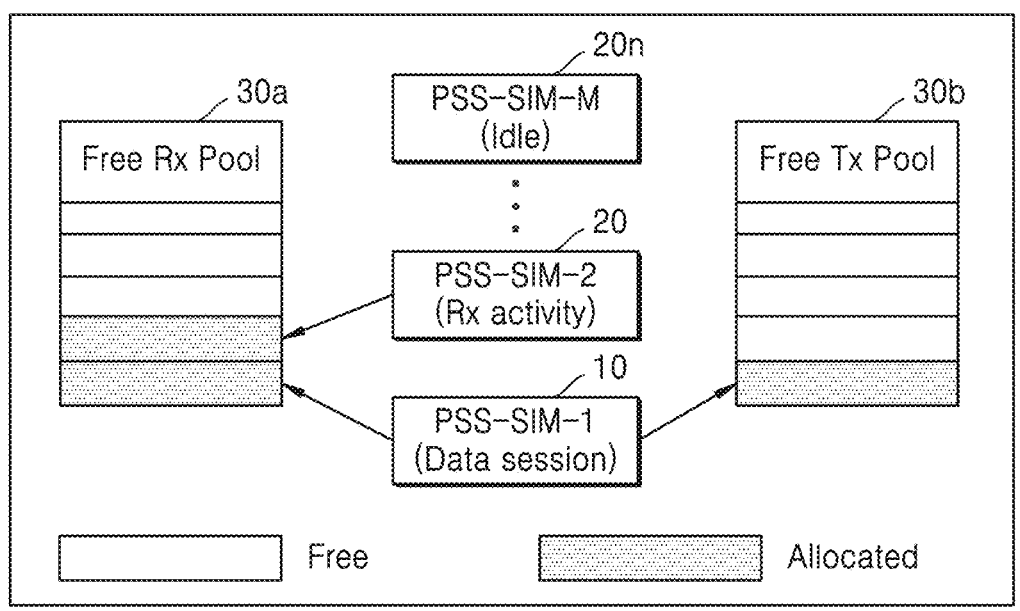
FIG. 1B illustrates a free pool concept of the multi-SIM UE with the multi Rx and Tx paths.

FIG. 1B illustrates a free pool concept of the multi-SIM UE with the multi Rx and Tx paths. The primary SIM (10) communicates data packets through a dedicated Rx and Tx path. The dedicated Rx and Tx path is allocated to the secondary SIMs (20-20n) when the secondary SIMs (20-20n) are to complete the higher priority operation and the Rx and Tx path is/are not available inside a free pool (30a-30b). The free pool (30a-30b) includes a plurality of Tx paths and a plurality of Rx paths for performing different activities (e.g., data session, Rx operation, Tx operation, etc.) aligned with each SIM's state (e.g., active, idle, etc.). In addition, the plurality of paths is retained dependent on a priority of created events associated with the secondary SIMs (20-20n) and/or the primary SIM (10).

Referring now to the drawings, and more particularly to FIGS. 2 through 4E, where similar reference characters denote corresponding features consistently throughout the figures, there are shown an example embodiment.

Figure 2:
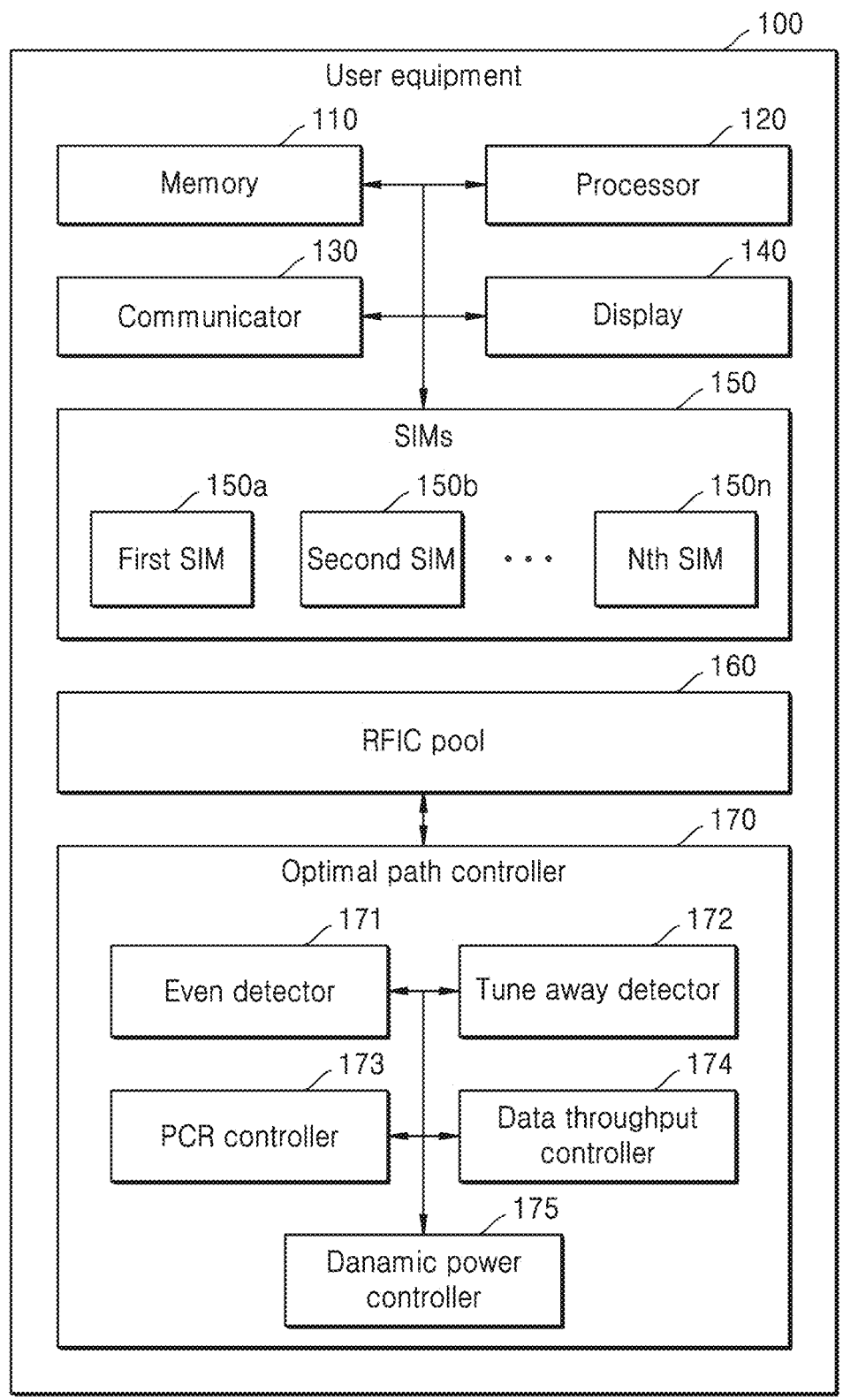
FIG. 2 illustrates a block diagram of a UE for identifying an optimal (or more efficient) number of paths between a RFIC and a plurality of SIMS, according to an example embodiment as disclosed herein.

FIG. 2 illustrates a block diagram of a UE (100) for identifying an optimal (e.g., more efficient) number of paths between a RFIC (160) (Throughout this disclosure, the terms "RFIC", "RFIC pool" and "free pool" are used interchangeably and have the same meaning or similar meanings) and a plurality of SIMS (150), according to an example embodiment as disclosed herein. Examples of the UE (100) include, but are not limited to a smartphone, a tablet computer, a Personal Digital Assistant (PDA), an Internet of Things (IoT) device, a wearable device, etc.

In an example embodiment, the UE (100) may include a memory (110), a processor (120), a communicator (130), a display (140), a plurality of SIMs (150), a RFIC pool (160), and/or an optimal path controller (170).

In an example embodiment, the memory (110) may be configured to store data related to various events detected at a primary SIM (150a) (e.g., the First SIM) and/or at least one secondary SIM (e.g., a second SIM (150b)-$N^{th}$ SIM (150n)), and/or the optimal (more efficient) number of paths based on a tune away duration, a PCR loss/wastage, and/or a data throughput degradation. The memory (110) may store instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) may be configured to store larger amounts of information than the memory. In certain examples, a non-transitory storage medium may store data that may, over time, change (e.g., in Random Access Memory (RAM) or cache). The memory (110) may be an internal storage unit or it may be an external storage unit of the UE (100), a cloud storage, or any other type of external storage.

The processor (120) may communicate with the memory (110), the communicator (130), and/or the display (140). The processor (120) may be configured to execute instructions stored in the memory (110) and to perform various processes. The processor (120) may include one or a plurality of processors, a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (130) may be configured for communicating internally between internal hardware components and with external devices (e.g. eNodeB, gNodeB, server, etc.) via one or more networks (e.g. Radio technology). The communicator (130) may include an electronic circuit specific to a standard that enables wired or wireless communication.

According to an example embodiment, operations described herein as being performed by the UE (100), the processor (120), the communicator (130) and/or the optimal path controller (170) may be implemented by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. Processing circuitry may also refer to logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. According to an example embodiment, the optimal path controller (170) may be implemented by the processor (120).

In an example embodiment, the optimal path controller (170) may be configured to detect the event associated with the primary SIM (150a) of the plurality of SIMS (150). Further, the optimal path controller (170) may be configured to detect the event associated with the secondary SIM (150b-150n) of the plurality of SIMS (150). The detected event associated with the secondary SIM (150b-150n) may include a Paging reception (P), Measurements (MES), a System Information Block (SIB), and/or a Signaling (SIG). The event associated with the primary SIM (150a) may be being active in a data session, and where the event associated with the secondary SIM (150b-150n) may be being one of an idle state, a periodic activity state, an aperiodic activity state, and/or a higher-priority state to establish connectivity with a server.

Further, the optimal path controller (170) may be configured to determine the tune away duration associated with the primary SIM (150a) based on the detected event associated with the secondary SIM (150b-150n). Further, the optimal path controller (170) may be configured to obtain (e.g., determine) an amount of resource loss by the primary SIM (150a) and/or a data throughput reduction of the primary SIM (150a) due to the tune away duration. Further, the optimal path controller (170) may be configured to determine the optimal (or more efficient) number of paths between the RFIC and the plurality of SIMS (150) based on the obtained resource loss and the data throughput reduction.

Further, the optimal path controller (170) may be configured to allocate a transmitting path and a receiving path to the primary SIM (150a) from a free pool (160) of the RFIC of the UE (100), where the free pool (160) includes a plurality of transmitting paths and a plurality of receiving paths. Further, the optimal path controller (170) may be configured to allocate a remaining transmitting path from the plurality of transmitting paths and a remaining receiving path from the plurality of receiving paths to the secondary SIM (150b-150n).

In an example embodiment, the optimal path controller (170) may be configured to analyze the detected plurality of events in each SIM for each TTI. Further, the optimal path controller (170) may be configured to determine a higher-priority event from the detected plurality of events that occurs on the secondary SIM (150b-150n). The SIG may be a higher-priority event that involves a UL and a DL for message exchanges, and the P, MES, and SIB may be lower priority events that involve the DL for message exchanges. Further, the optimal path controller (170) may be configured to perform one of: configuring the remaining transmitting path and the remaining receiving path for the secondary SIM (150b-150n) to determine the tune away duration in response to determining that the higher-priority event from the detected plurality of events occurs on the secondary SIM (150b-150n); and/or configuring the remaining receiving path (e.g., without configuring the remaining transmitting path) for the secondary SIM (150b-150n) to determine the tune away duration in response to determining that the higher-priority event from the detected plurality of events does not occur on the secondary SIM (150b-150n).

In an example embodiment, the optimal path controller (170) may be configured to determine whether the remaining transmitting path and the remaining receiving path are available to allocate to the secondary SIM (150b-150n). Further, the optimal path controller (170) may be configured to allocate the transmitting path of the primary SIM (150a) to the secondary SIM (150b-150n) when the remaining transmitting path is not available for the secondary SIM (150b-150n). Further, the optimal path controller (170) may be configured to allocate the receiving path of the primary SIM (150a) to the secondary SIM (150b-150n) when the remaining receiving path is not available for the secondary SIM (150b-150n). Further, the optimal path controller (170) may be configured to decrement (e.g., manage the free pool of the RFIC by indicating the available transmitting paths is reduced by one) the remaining transmitting path and allocate the decremented remaining transmitting path to the secondary SIM (150b-150n) when the remaining transmitting path is available for the secondary SIM (150b-150n). Further, the optimal path controller (170) may be configured to decrement (e.g., manage the free pool of the RFIC by indicating the available receiving paths is reduced by one) the remaining receiving path and allocate the decremented remaining receiving path to the secondary SIM (150b-150n) when the remaining receiving path is available for the secondary SIM (150b-150n).

In an example embodiment, the optimal path controller (170) may be configured to determine whether a value of an event duration associated with each event from the detected plurality of events is greater than a physical link monitor timer. Further, the optimal path controller (170) may be configured to perform one of: detect the resource loss and the data throughput reduction by analyzing the detected plurality of events in each SIM for each TTI based on an allocation rate of the PCR and the event duration associated with each event in response to determining that the value of the event duration associated with each event from the detected plurality of events is not greater than the physical link monitor timer, where the resource is a PSR; and/or detect the resource loss and the data throughput reduction by analyzing the detected plurality of events in each SIM for each TTI based on the allocation rate of the PCR and the physical link monitor timer.

In an example embodiment, the optimal path controller (170) may be configured to determine maximum (or highest) receiving paths (N1max) and maximum (or highest) transmitting paths (N2max) for the secondary SIM (150b-150n) based on the detected resource loss and the detected data throughput, where the maximum (or highest) receiving paths and the maximum (or highest) transmitting paths includes values less than a threshold limit.

In an example embodiment, the optimal path controller (170) may be configured to detect the event associated with the UE (100). Further, the optimal path controller (170) may be configured to apply a weight (w1) applied to obtain optimal (or more efficient) number of Rx paths N1max and Tx paths N2max for each combination of the plurality of transmitting paths and the plurality of receiving paths for the detected event that involves tune away of the Rx path and Tx path from the primary SIM, when no Rx Path and Tx path are available in the free pool of RFIC for the Rx and Tx path. Weight "1-w1", throughput degradation, is applied to throughput loss. Further, the optimal path controller (170) may be configured to obtain a combined metric of the resource loss and the data throughput reduction for each combination of the plurality of transmitting paths and the plurality of receiving paths for the detected event. Further, the optimal path controller (170) may be configured to select the optimal (or more efficient) number of $N_1$-Rx and $N_2$-Tx from the determined N1max and N2max, and obtained combined metrics, to reduce resource loss and/or data throughput reduction associated with the primary SIM (150a).

In an example embodiment, the optimal path controller (170) may include an event detector (171), a tune away detector (172), a PCR controller (173), a data throughput controller (174), and/or a dynamic power controller (175). According to an example embodiment, the event detector (171), the tune away detector (172), the PCR controller (173), the data throughput controller (174), and/or the dynamic power controller (175) may be implemented using processing circuitry.

In an example embodiment, the event detector (171) may detect various events at the primary SIM (150a) and the secondary SIM (150b-150n) using the PSS of the UE (100). Furthermore, each PSS for each SIM (150) may correspond (e.g., belong) to a different operator and use idle mode procedures to select a Paging Occasion (PO), which may be determined based on a Discontinuous Reception (DRX)-based rule, and the UE (100) may decode paging once per DRX cycle. Furthermore, the PSS for each secondary SIM (150b-150n) may follows the idle mode, decoding paging once per DRX cycle by selecting the PO.

The PSS may evaluate measurements for both a serving cell as well as neighboring cells based on measurement thresholds. The PSS may also maintain mobility-based states like higher, medium, or normal mobility, to apply scaling rules while doing cell reselections. These procedures may lead to additional signaling like Random Access (RA) and Tracking Area Update (TAU). System Information Broadcast (SIB) may also be monitored based on periodicity or due to a change of cell. Furthermore, during the tune away period for Operator-1 associated with the primary SIM (150a), the PCR may continue to be allocated to the UE (100) until the expiry of timer 'T310', which is the physical link monitor timer in 5G New Radio (NR).

In an example embodiment, the event detector (171) may identify events that are caused by the idle mode procedures, such as the paging reception {P}, the measurements {MES}, the System Information Block (SIB), and/or the Signaling {Sig}. The event detector (171) may evaluate the events across the secondary SIMs (150b-150n) for each Transmission Time Interval (TTI), and determine conditions when the Rx/Tx path is not available in the free pool (160). Equation (1) describes a set of possible scheduled events (outcomes) at any secondary SIM (150b-150n), $$\text{Events} = \{\emptyset\}, \{P\}, \{SIB\}, \{Sig\}, \{MES\}, \{P,SIB\}, \{P, MES\}, \{P,Sig\}, \{SIB,Sig\}, \{Sig,MES\}, \{SIB, MES\}, \{P,SIB,Sig\}, \{P,Sig,MES\}, \{P,SIB,MES\}, \{SIB,Sig,MES\}, \{P,SIB,Sig,MES\} \quad (1)$$

Whereas events like {P}, {SIB} and {MES} may involve only decoding in the DL, thus only the Rx path may be used. An event like {Sig} involves message exchanges in the UL as well as in the DL with the network, thereby using both the Rx and Tx paths. The event {Ø} represents a null or no outcome.

In an example embodiment, the event detector (171) may identify a duration associated with each event. Equation (2) describes time taken for carrying out the events, $$\text{Event}_{duration} = \{\{P\}_{duration}, \{SIB\}_{duration}, \{Sig\}_{duration}, \{MES\}_{duration}, \{P,SIB\}_{duration}, \{P,MES\}_{duration}, \{P,Sig\}_{duration}, \{SIB,Sig\}_{duration}, \{Sig, MES\}_{duration}, \{SIB,MES\}_{duration}, \{P,SIB, Sig\}_{duration}, \{P,Sig,MES\}_{duration}, \{P,SIB, MES\}_{duration}, \{SIB,Sig,MES\}_{duration}, \{P,SIB,Sig, MES\}_{duration}\} \quad (2)$$

In an example embodiment, the event detector (171) may determine an event outcome on each SIM for any TTI (i) is given by evaluating through equation (3), $$\text{Events}_i^m = \begin{cases} \text{Events}_i^m \cup \{P\}, (4), (5) \\ \text{Events}_i^m \cup \{MES\}, (6), (7) \\ \text{Events}_i^m \cup \{MES\}, (8), (9) \\ \text{Events}_i^m \cup \{MES\}, (10), (11) \\ \text{Events}_i^m \cup \{SIB\}, (12) \\ \text{Events}_i^m \cup \{SIB\}, (13) \\ \text{Events}_i^m \cup \{Sig\}, (14) \\ \text{Events}_i^m \cup \{Sig\}, (15) \\ \text{Events}_i^m \cup \{\emptyset\} \text{ otherwise} \end{cases} \quad (3)$$

Whereas $\text{Events}_i^m$ defines the events for the $m^{th}$ SIM (150) for the $i^{th}$ TTI. The International Mobile Subscriber Identity (IMSI) for the SIM (150) is denoted by the IMSI. The model may be based on parameters broadcasted in the SIB, $\text{DRX}_{CyclePeriod}$, a DRX Cycle duration in any network used to balance the paging channel load, $\text{Fast}_{Measurement}$, indicates the UE to perform faster measurements, $\text{Periodic}_{SIB_{timer}}$, periodic time after which the UE reads the SIB, $\text{Periodic}_{TA_{Timer}}$, periodic time after which the UE performs TAU, as specified in 3GPP.

In an example embodiment, the event detector (171) may determine the conditions when there is no available Rx/Tx path in the free pool (160), given by evaluating through equation (4) to (15), $$\left(\frac{i}{10} - \left(DRX_{Cycle_{Period}} \times \left\lfloor \frac{\left(\lfloor \frac{t}{10} \rfloor\right)}{DRX_{Cycle_{Period}}} \right\rfloor\right)\right) = \tag{4}$$

$$\left(IMSI - DRX_{Cycle_{Period}} \times \left\lfloor \frac{IMSI}{DRX_{Cycle_{Period}}} \right\rfloor\right)$$

$$(i - PAGE_{SF}) = \left\lfloor \frac{i - PAGE_{SF}}{TOTAL_{SF}} \right\rfloor \tag{5}$$

$$DRX_{Cycle_{Period}} \leq PAGING_{DRX} \times 10 \tag{6}$$

$$i - \left(MAX_{SFN} \times \left\lfloor \frac{i}{MAX_{SFN}} \right\rfloor\right) = 0 \tag{7}$$

The UE (100) may generate (e.g., trigger) a page event for each SIM (150), at every DRX cycle period to read a page message at a paging-subframe, where the DRX cycle period shall be less than 10 times that of DRX period, where Subframe numbers are rounded with MAX SFN(=1024) as per 3GPP.

The UE (100) may generate (e.g., trigger) a measurement event for each SIM (150), at the DRX Cycle period, with the constraint that the DRX cycle period shall be for page event shall be at least 2 times of DRX period and less than 1280 milliseconds (1 Subframe=1 milliseconds) MES Event generated at alternate DRX PAGING duration.

$$1280 < DRX_{Cycle_{Period}} \leq PAGING_{DRX} \times 20 \tag{8}$$

The UE (100) may generate (e.g., trigger) an MES event for each SIM (150), by rounding a running tick counter by twice of the paging DRX period for each SIM (50)

$$i - \left((PAGING_{DRX} \times 20) \times \left\lfloor \frac{i}{(PAGING_{DRX} \times 20)} \right\rfloor\right) = 0 \tag{9}$$

When the UE (100) is configured with fast measurement support (e.g., high speed measurement flag is set) then the UE (100) on detection of higher speed, may perform measurement at every DRX Paging period.

$$Fast_{Measurement} = 1 \tag{10}$$

$$i - \left(DRX_{Cycle_{Period}} \times \left\lfloor \frac{i}{DRX_{Cycle_{Period}}} \right\rfloor\right) = 0 \tag{11}$$

The UE (100) may generate (e.g., trigger) SIB events for each SIM (150) at the periodic SIB reading timer expiry.

$$i - \left(Periodic_{SIB_{timer}} \times \left\lfloor \frac{i}{Periodic_{SIB_{timer}}} \right\rfloor\right) = 0 \tag{12}$$

The UE (100) may generate (e.g., trigger) an SIB event at every cell boundary to check and perform cell update, a 3GPP procedure.

$$i - \left(\left(\frac{cell_{size} \times 3600 \times \alpha_{deploy}}{UE_{Speed}}\right) \times \left\lfloor \frac{i}{\frac{cell_{Size} \times 3600 \times \alpha_{deploy}}{UE_{Speed}}} \right\rfloor\right) = 0 \tag{13}$$

The UE (100) may generate (e.g., trigger) a SIG event at the expiry of a periodic tracking area timer.

$$i - \left(Periodic_{TA_{timer}} \times \left\lfloor \frac{i}{Periodic_{TA_{timer}}} \right\rfloor\right) = 0 \tag{14}$$

The UE (100) may generate (e.g., trigger) a SIG event, also at the change of a tracking area.

$$i - \left(\left(\frac{TA_{size} \times 3600 \times \alpha_{deploy}}{UE_{Speed}}\right) \times \left\lfloor \frac{i}{\frac{TA_{Size} \times 3600 \times \alpha_{deploy}}{UE_{Speed}}} \right\rfloor\right) = 0 \tag{15}$$

Whereas $Cell_{Size}$ is a size of the cell in meters, $UE_{Speed}$ is a velocity of the UE in kilometer per hour (kmph) with which it is moving, and $\alpha_{deploy}$ is a deployment specific factor, which corresponds to the overlap considered for defining cell edges and cell boundaries in an operator's deployment. $TA_{Size}$ is the size of the TA in meters.

In an example embodiment, the tune away detector (172) may determine a total Rx tune away and a total Tx tune away duration for the primary SIM (150a). As discussed earlier, the UE (100) with $N_{1max}$ Rx paths (e.g., the maximum or highest number of Rx paths) and $N_{2max}$ Tx paths (e.g., the maximum or highest number of Tx paths), the primary SIM (150a) gets the dedicated Rx and Tx path, thereby there are ($N_{1max}-1$) and ($N_{2max}-1$) available Rx and Tx paths for (M−1) secondary SIMs (150b-150n). While the events are generated at each secondary SIM (150b-150n), if the Rx or Tx path is unavailable in the free pool (160) of Rx and Tx paths, then it is allocated from the one which was being used by the primary SIM (150a). Thereby, causing the tune away for the operator-1.

In an example embodiment, the tune away detector (172) may determine Rx Tune away in TTI (i) may happen for the primary SIM (150a) as given by condition (16) and Tx Tune away in TTI (i) may happen as given by condition (17), $$\Sigma_{m=1}^{m=(M-1)} |Events_i^m| - (N_{1max}-1) > 0 \tag{16}$$

$$\Sigma_{m=1}^{m=(M-1)} |Events_i^m \cap \{Sig\}| - (N_{2max}-1) > 0 \tag{17}$$

In an example embodiment, the tune away detector (172) may determine the total Rx tune away duration for the primary SIM (150a) for the period T is given as (18), $$Rx\ Tuneaway_{duration}(T) = \sum_{i=0}^{i=T} \sum_{j=1}^{j=\left(\Sigma_{m=1}^{m=(M-1)} |Events_i^m(t)| - (N_{1max}-1)\right)} Event_{duration_i} \tag{18}$$

In an example embodiment, the tune away detector (172) may determine the total Tx tune away duration for the primary SIM (150a) for the period T is given as (19)

$$Tx\ Tuneaway_{duration}(T) = \qquad (19)$$

$$\sum_{i=0}^{i=T} \sum_{j=1}^{j=(\sum_{m=1}^{m=(M-1)}|Events_i^m(t) \cap \{Sig\}|-(N_{2max}-1))} Event_{duration_i}$$

In an example embodiment, the PCR controller (173) may determine a total PCR wastage (e.g., the amount of resource (such as, PCR resources) loss by the primary SIM (150a)) by obtaining a total Rx PCR wastage and a total Tx PCR wastage. The total Rx PCR wastage may be given by (20), where the T310 is the physical link monitor timer, and the $PCR_{AllocationRate}$ is the rate at which resources are allocated to the primary SIM (150a) during the ongoing data session.

$$RxPCR_{Wastage}(T) = PCR_{AllocationRate} \times \qquad (20)$$

$$\sum_{i=0}^{i=T} \sum_{j=1}^{j=(\sum_{m=1}^{m=(M-1)}|Events_i^m(t)|-(N_{1max}-1))} \min(Event_{duration_i}, T310)$$

In an example embodiment, the PCR controller (173) may determine the total Tx PCR wastage is given by (21), $$TxPCR_{Wastage}(T) = \qquad (21)$$

$$PCR_{AllocationRate} \times \sum_{i=0}^{i=T} \sum_{j=1}^{j=(\sum_{m=1}^{m=(M-1)}|Events_i^m(t) \cap \{Sig\}|-(N_{2max}-1))}$$

$$\min(Event_{duration_i}, T310)$$

Accordingly, in an example embodiment, the Rx PCR wastage and Tx PCR wastage may each be determined based on the PCR allocation rate and the smaller among the event duration and the physical link monitor timer. In an example embodiment, the PCR controller (173) may determine the total PCR wastage is given as (22), which is the sum of (20) and (21), $$PCR_{Wastage}(T) = RxPCR_{Wastage}(T) + TxPCR_{Wastage}(T) \qquad (22)$$

In an example embodiment, the PCR controller (173) may determine the optimal (or more efficient) value of $N_{1max}$ and $N_{2max}$, for which the total PCR wastage, given by (22) is to be minimized (or reduced). The PCR wastage may not be minimized (or reduced) to zero ('0') as it would mean having, as many Rx and Tx paths as there are SIMs (150). Thus, a design specific constraint parameter (e.g., a threshold value) is chosen, given by C. It is the maximum (or highest) allowed PCR wastage in percentage (%), beyond which the Multi-SIM UE (100) should not be allowed to waste the resources on the primary SIM (150a) due to the tune away. According to an example embodiment, the data throughput controller may determine $N_{1max}$ and $N_{2max}$ for the at least one secondary SIM (150b-150n) based on the PCR wastage, wherein $N_{1max}$ and $N_{2max}$ have values less than C. The minimization (or reduction) challenge may be represented by the constraint in (23), $$\frac{PCR_{Wastage}(T)}{PCR_{AllocationRate} \times T} \times 100 \leq C \qquad (23)$$

Now, substituting (20) and (21) into (23), $$\left( \left( \sum_{i=0}^{i=T} \sum_{j=1}^{j=(\sum_{m=1}^{m=(M-1)}|Events_i^m(t)|-(N_{1max}-1))} \min(Event_{duration_i}, T310) \right) + \right. \qquad (24)$$

$$\left. \left( \sum_{i=0}^{i=T} \sum_{j=1}^{j=(\sum_{m=1}^{m=(M-1)}|Events_i^m(t) \cap \{Sig\}|-(N_{2max}-1))} \min(Event_{duration_i}, T310) \right) \right) \leq \frac{c}{100}$$

In an example embodiment, the data throughput controller (174) may determine the loss of data throughput for the primary SIM (150a) is given by (27) which is a sum of the data throughput degradation in the DL and the UL given by (25) and (26) respectively, $$L_{degrade}(T) = PCR_{AllocationRate} \times \qquad (25)$$

$$\sum_{i=0}^{i=T} \sum_{j=1}^{j=(\sum_{m=1}^{m=(M-1)}|Events_i^m(t)|-(N_{1max}-1))} (Event_{duration_i})$$

$$UL_{degrade}(T) = PCR_{AllocationRate} \times \qquad (26)$$

$$\sum_{i=0}^{i=T} \sum_{j=1}^{j=(\sum_{m=1}^{m=(M-1)}|Events_i^m(t) \cap \{Sig\}|-(N_{2max}-1))} (Event_{duration_i})$$

$$TP_{degrade}(T) = DL_{degrade}(T) + UL_{degrade}(T) \qquad (27)$$

In an example embodiment, the data throughput controller (174) may determine the optimal (or more efficient) value of $N_{1max}$ and $N_{2max}$, the total data throughput degradation, given by (27) is to be minimized (or reduced). The degradation may not be minimized (or reduced) to zero ('0') as it would mean having, as many Rx and Tx paths as there are SIMs (150). Thus, a design specific constraint parameter is chosen, given by $TP_K$. It is the maximum (or highest) allowed data throughput degradation in percentage (%), beyond which the Multi-SIM UE (100) should not be experiencing on the primary SIM (150a) due to the tune away. The minimization (or reduction) challenge may be represented by the constraint in (28), $$\frac{TP_{degrade}(T)}{PCR_{AllocationRate} \times T} \times 100 \leq TP_k \qquad (28)$$

Now, substituting (25) and (26) in (28), $$\left( \left( \sum_{i=0}^{i=T} \sum_{j=1}^{j=(\sum_{m=1}^{m=(M-1)}|Events_i^m(t)|-(N_{1max}-1))} Event_{duration_i} \right) + \right. \qquad (29)$$

$$\left. \left( \sum_{i=0}^{i=T} \sum_{j=1}^{j=(\sum_{m=1}^{m=(M-1)}|Events_i^m(t) \cap \{Sig\}|-(N_{2max}-1))} Event_{duration_i} \right) \right) \leq \frac{TP_k}{100}$$

In an example embodiment, the dynamic power controller (175) may determine the combination of the PCR wastage and the UE throughput degradation for the UE (100) which satisfies the constraints is given by (30), which combines (24) and (29) with weights w1 and w2=(1−w1) respectively.

$$\left( \left[ \sum_{i=0}^{i=T} \sum_{j=1}^{j=\left(\sum_{m=1}^{m=(M-1)} |Events_i^m(t)| - (N_{1max}-1)\right)} (w1 \times \min(Event_{duration_i}, \right.\right.$$

$$\left.\left. T310) + (1-w1) \times Event_{duration_i} \right] \right) +$$

$$\left( \left[ \sum_{i=0}^{i=T} \sum_{j=1}^{j=\left(\sum_{m=1}^{m=(M-1)} |Events_i^m(t) \cap \{Sig\}| - (N_{2max}-1)\right)} \right.\right.$$

$$(w1 \times \min(Event_{duration_i}, T310) +$$

$$\left.\left. (1-w1) \times Event_{duration_i} \right] \right) \leq$$

$$\frac{((w1 \times C) + (1-w1) \times TP_k)}{100}$$

According to an example embodiment, UE (100) may apply the weight w1 to events that are serviced by tuning away an Rx path and Tx path from an active session of the primary SIM (150a). According to an example embodiment, the UE (100) may apply the weight w2 to an amount of throughput degradation corresponding to the tuning away the Rx path and the Tx path. According to an example embodiment, the UE (100) may obtain an optimal (or more efficient) number of Rx paths (N1max) and an optimal (or more efficient) number of Tx paths (N2max) based on the maximum (or highest) allowed PCR wastage "C" combined with the first weight "w1", and the maximum (or highest) allowed throughput degradation "TPk" combined with the second weight "w2". According to an example embodiment, the UE (100) may obtain a combined metric of a respective resource loss and a respective data throughput reduction for each combination of the plurality of transmitting paths and the plurality of receiving paths for at least one of the plurality of events. According to an example embodiment, the UE (100) may determine the optimal (or more efficient) number of $N_1R_x$ and $N_2T_x$ paths based on the combined metric, the number of Rx paths (N1max) and the number of Tx paths (N2max). According to an example embodiment, the UE (100) may dynamically enable one or more transmitting paths or receiving paths by turning them on (e.g., for more critical paths), and/or may dynamically disable one or more transmitting paths or receiving paths (e.g., according to the PCR wastage constraint and the throughput loss constraint) by turning them off (e.g., to conserve power). According to an example embodiment, the UE (100) may generate a signal and transmit the signal via the enabled one or more transmitting paths, and/or may receive and demodulate/decode a signal received via the enabled one or more receiving paths.

Although the FIG. 2 shows various hardware components of the UE (100), it is to be understood that an example embodiment is not limited thereon. In an example embodiment, the UE (100) may include less or more of components. Further, the labels or names of the components are used only for illustrative purpose and do not limit the scope of an example embodiment. One or more components may be combined together to perform same or substantially similar function to identify the optimal (or more efficient) number of paths between the RFIC and the plurality of SIMS (150).

FIG. 3 is a flow diagram (300) illustrating a method for identifying the optimal (or more efficient) number of paths between the RFIC and the plurality of SIMS (150), according to an example embodiment as disclosed herein. The operations (S302-S322) may be performed by the optical path controller (170).

At S302, the method includes allocating the transmitting path and the receiving path to the primary SIM (150a) from the free pool (160) of the RFIC of the UE (100), where the free pool (160) includes the plurality of transmitting paths and the plurality of receiving paths. At S304, the method includes allocating the remaining transmitting path from the plurality of transmitting paths and the remaining receiving path from the plurality of receiving paths to one of the secondary SIMS (150b-150n) (also referred to herein as the secondary SIM (150b-150n)). At S306, the method includes detecting the event associated with the primary SIM (150a) of the plurality of SIMS (150). At S308, the method includes detecting the event associated with the secondary SIM (150b-150n) of the plurality of SIMS (150).

At S310, the method includes analyzing the detected plurality of events in each SIM (150) for each TTI. At S312, the method includes determining whether the higher-priority event from the detected plurality of events occurs on the secondary SIM (150b-150n). At S314, the method includes configuring the remaining transmitting path and the remaining receiving path for the secondary SIM (150b-150n) to determine the tune away duration in response to determining that the higher-priority event from the detected plurality of events occurs on the secondary SIM (150b-150n). At S316, the method includes configuring the remaining receiving path for the secondary SIM (150b-150n) to determine the tune away duration in response to determining that the higher-priority event from the detected plurality of events does not occur on the secondary SIM (150b-150n).

At S318, the method includes determining the tune away duration associated with the primary SIM (150a) based on the detected event associated with the secondary SIM (150b-150n). At S320, the method includes obtaining the amount of resource loss by the primary SIM (150a) and the data throughput reduction of the primary SIM (150a) due to the tune away duration. At S322, the method includes determining the optimal (or more efficient) number of paths between the RFIC and the plurality of SIMS (150) based on the obtained resource loss and the data throughput reduction to reduce the resource loss and the data throughput reduction associated with the primary SIM (150a).

The various actions, acts, blocks, operations, or the like in the flow diagram (300) may be performed in the order presented, in a different order or simultaneously (or contemporaneously). Further, in an example embodiment, some of the actions, acts, blocks, operations, or the like may be omitted, added, modified, skipped, or the like without departing from an example embodiment.

In an example embodiment, the UE (100) may select the right number of Rx and Tx paths by:
  i. Modeling of dense network deployment (overlapping operators), and mobility conditions of the UE (100) to generate a set of worst-case critical scenarios.
  ii. Identifying each critical scenario in (i) and for all combinations of Rx and Tx paths between $\{1, \ldots, N_{1max}\}$ and $\{1, \ldots, N_{2max}\}$ respectively, obtain the PCR wastage for operator-1 (primary SIM (150a)). The PCR wastage and throughput degradation for each combination of Rx and Tx paths configuration may be calculated using (22), (27).
  iii. Applying the design constraint given by (30), to obtain the right numbers of Rx and Tx paths for any number of SIMs as desired. The procedure to select a number of Rx and Tx paths in the design of the Multi-SIM UE (100).

In an example embodiment, the UE (100) may obtain a corollary of the data for each scenario, and for each combination of Rx and Tx path the PCR Wastage and data throughput degradation is available. Thus, for any scenario, the least number of Rx and Tx paths may be derived with which (30) may be satisfied. The UE (100) selects a dynamic scenario-specific Rx/Tx path in the Multi-SIM UE (100). For any given scenario that the UE (100) is experiencing in a field, only the lowest number of Rx and Tx paths will be enabled, yet keeping the PCR wastage and the data throughput degradation below a target. Thus, the multi-SIM UE (100) may save power by gating the remaining Rx or Tx Paths. A novel dynamic power saving by the dynamic power controller (175) may be achieved by the following operations, iv. Detecting the scenario experienced by the UE (100), e.g., network parameters and UE speed ($UE_{Speed}$), say scenario k.

v. Detecting a combined metric (PCR wastage and data throughput degradation) for each combination of Rx and Tx path, in $Constraint_{Percentage}[N_1][N_2][MAX_{CriticalScenarios}]$ for the scenario k detected in operation (iv), and select the combination with a minimum (or lowest) number of $N_{1min}$ Rx paths and $N_{2min}$ Tx paths, which may meet the condition in (30).

vi. Disabling ($N_1$–$N_{1min}$) Rx paths and ($N_2$–$N_{2min}$) Tx Paths in the Multi-SIM UE (100) while the UE (100) remains in the scenario k as detected in operation (iv).

An event simulation model of the UE (100): In an example scenario, an event-generation model may be used as a simulated testbed with multiple operator deployment (like in field) across the PSS for each secondary SIM (150b-150n). The event generation for each PSS may be dependent on the frame timings of the cells in the respective operator's network, IMSI belonging to the SIM (150), the UE mobility coupled with complex static scenarios like, UE at the cell edge and experiencing ping pong between two cells, or at the Tracking Area (TA) edge and experiencing ping pong between two TAs.

In dense urban deployment, for different geometry (location and mobility) of the UE (100), and generated the events occurring on each secondary SIM (150b-150n). Each event duration was known a-prior based on the time taken (average) on commercial UEs in the testbed.

Overall, the combination of network parameters for operators of the secondary SIMs (150b-150n), traffic parameters for the primary SIM (150a), and secondary SIMs (150b-150n) IMSI maximizes (or increases) the tune away for the primary SIM (150a).

FIGS. 4A-4E illustrate a comparison between the proposed method and the conventional method for RFIC configuration, according to an example embodiment as disclosed herein.

Figure 4A:
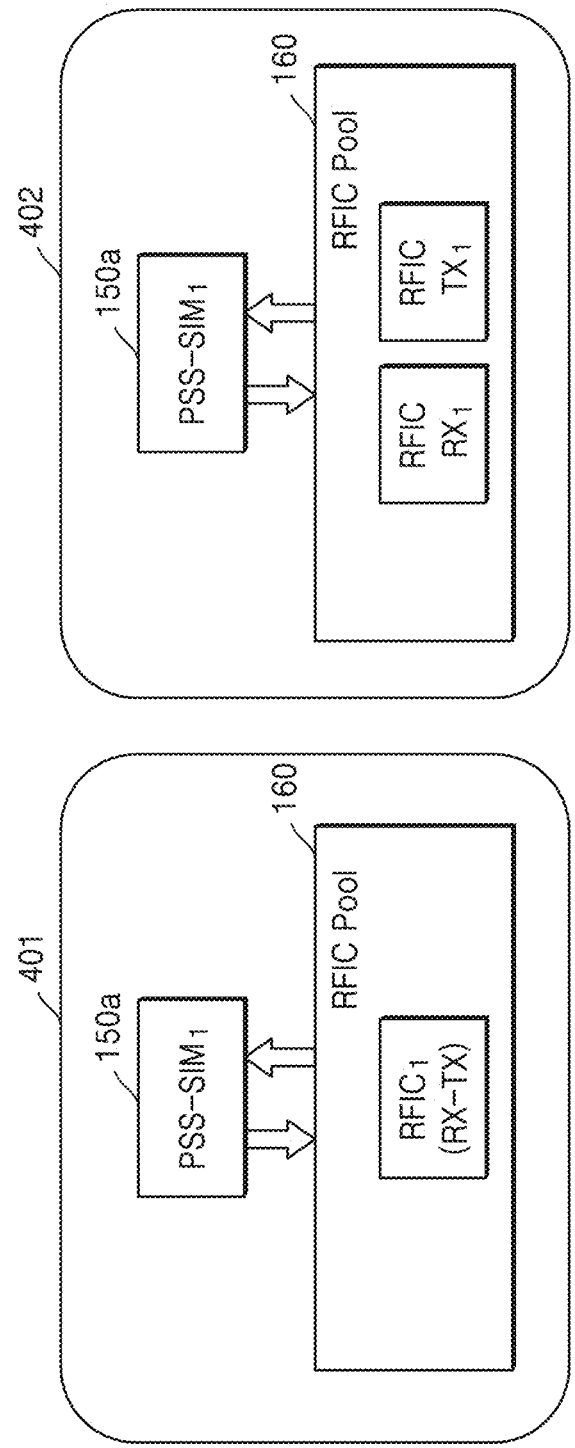
FIGS. 4A-4E illustrate a comparison between a proposed method and the conventional method for RFIC configuration, according to an example embodiment as disclosed herein.

Referring to FIG. 4A: At 401, shows a conventional RFIC configuration in a single SIM UE with a single RFIC (e.g., $RFIC_1$ (Rx-Tx)) for the Tx/Rx path in the RFIC pool (160). At 402, shows a proposed RFIC configuration in a single SIM UE (100) with a dual RFIC (e.g., RFIC $Rx_1$ and RFIC $Tx_1$)) for the Tx/Rx paths in the RFIC pool (160).

Figure 4B:
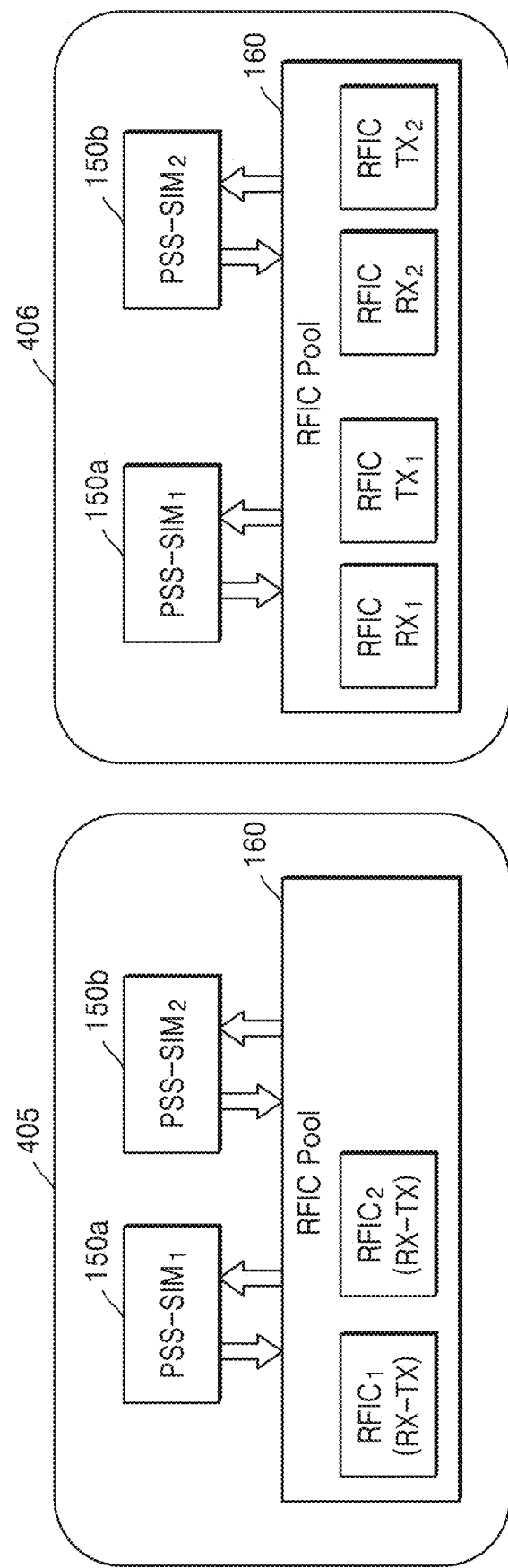

Referring to FIG. 4B: At 403, shows the conventional RFIC configuration in a dual SIM UE with the single RFIC for the Tx/Rx paths in the RFIC pool (160)/share the same RFIC (or similar RFICs) with tune away. At 404, shows the proposed RFIC configuration in a dual SIM UE (100) with a dual RFIC (e.g., RFIC $Rx_1$ and RFIC $Tx_1$)) for the Tx/Rx paths in the RFIC pool (160)/share the same set (or similar sets) of RFIC with tune away.

Figure 4C:
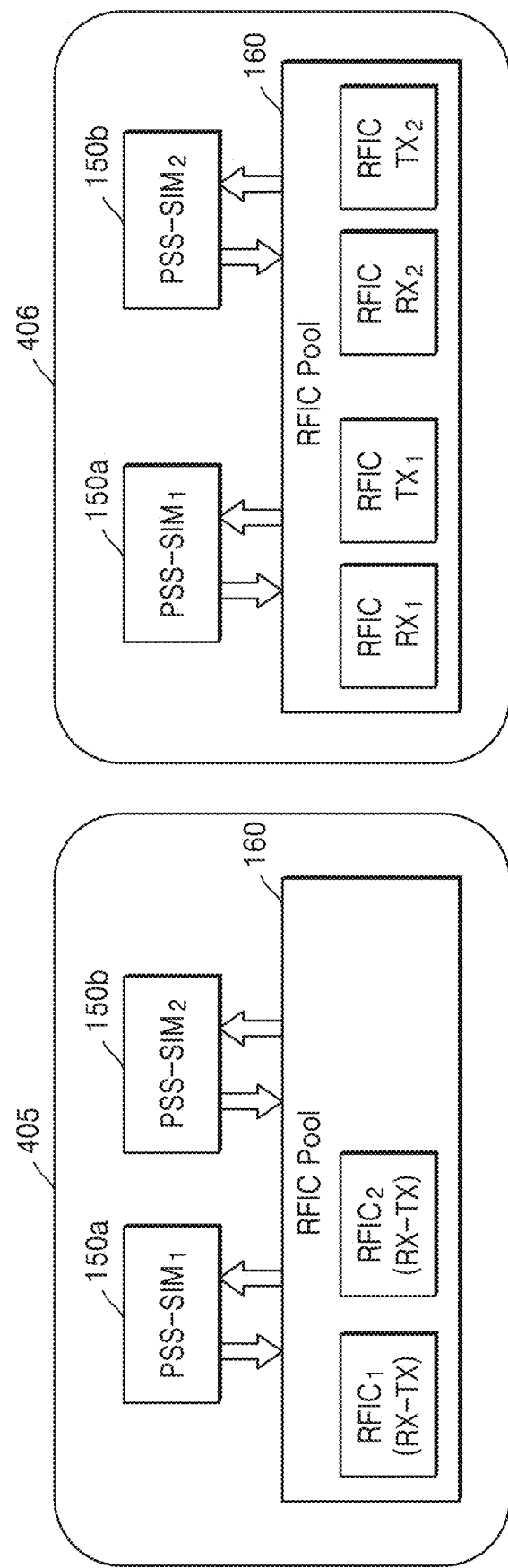

Referring to FIG. 4C: At 405, shows the conventional RFIC configuration in the dual SIM UE with separate RFIC (e.g., $RFIC_1$ (Rx-Tx) and $RFIC_2$ (Rx-Tx)) for the Tx/Rx paths in the RFIC pool (160)/allocates separate RFIC without tune away. At 406, shows the proposed RFIC configuration in the dual SIM UE (100) with multiple RFIC (e.g., RFIC $Rx_1$, RFIC $Tx_1$, RFIC $Rx_2$, RFIC $Tx_2$) for the Tx/Rx paths in the RFIC pool (160)/allocates separate RFIC without tune away.

Figure 4D:
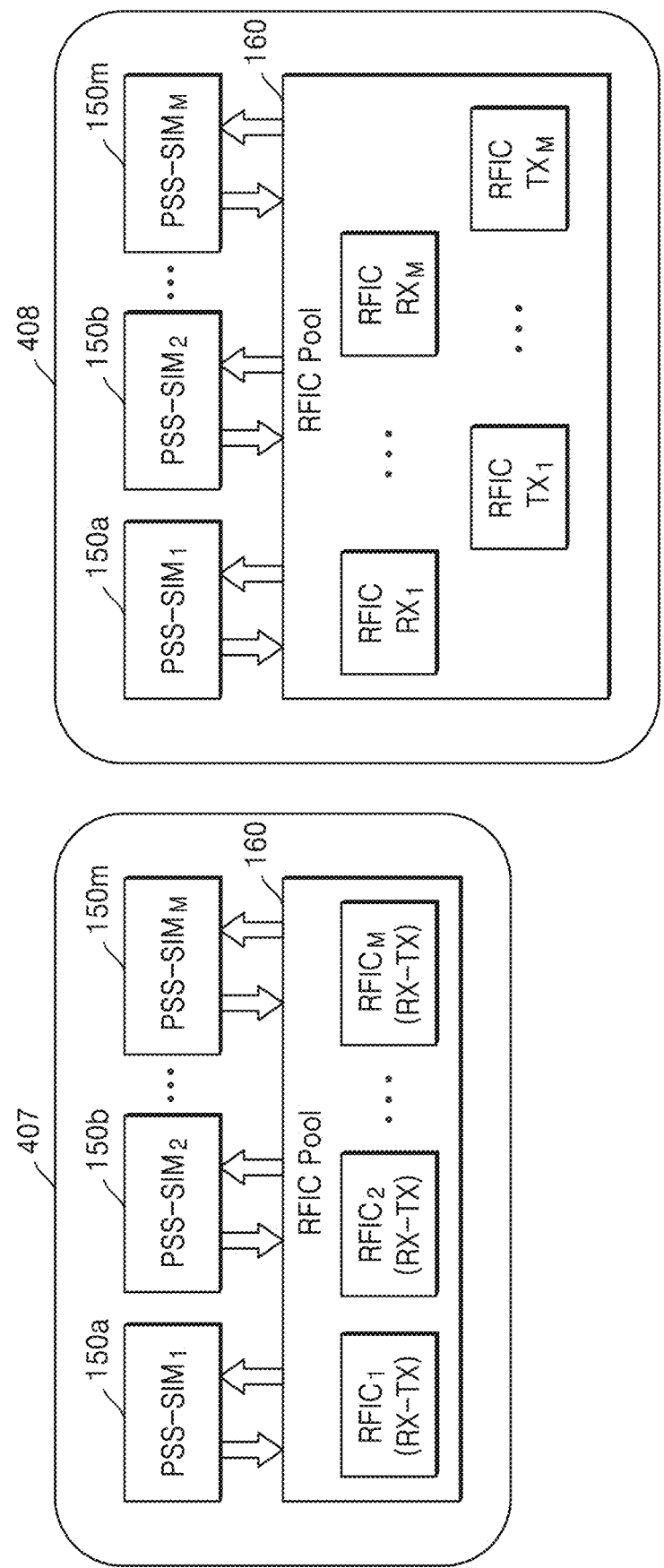

Referring to FIG. 4D: At 407, shows the conventional RFIC configuration in M-SIM UE with separate RFIC (e.g., $RFIC_1$ (Rx-Tx) and $RFIC_2$ (Rx-Tx) ... $RFIC_M$ (Rx-Tx)) for the Tx/Rx paths in the RFIC pool (160)/allocates separate RFIC without tune away. At 408, shows the proposed RFIC configuration in the M-SIM UE (100) with multiple RFIC (e.g., RFIC $Rx_1$, RFIC $Tx_1$, RFIC $Rx_2$, RFIC $Tx_2$, ..., RFIC $Rx_M$, RFIC $Tx_M$) for the Tx/Rx paths in the RFIC pool (160)/allocates separate RFIC without tune away.

Figure 4E:
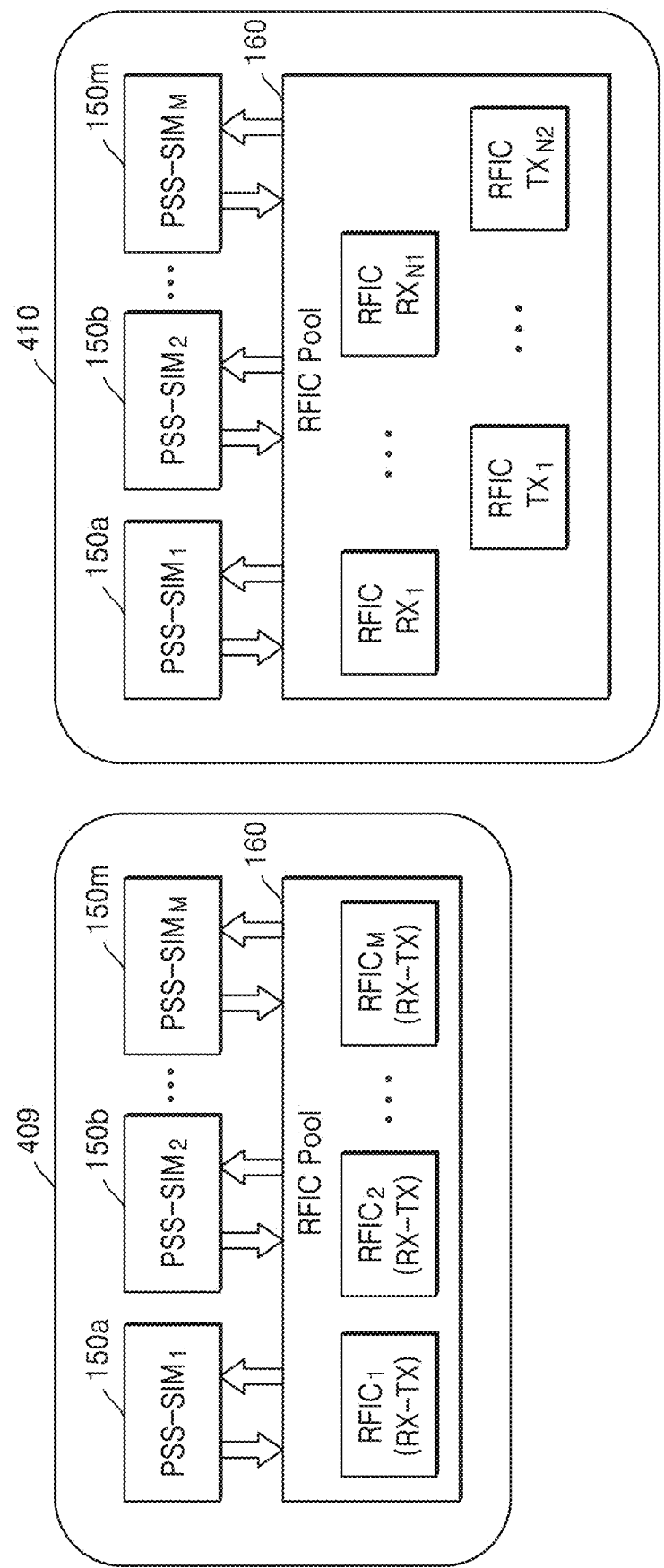

Referring to FIG. 4E: At 409, shows the conventional RFIC configuration in M-SIM UE with separate RFIC (e.g., $RFIC_1$ (Rx-Tx) and $RFIC_2$ (Rx-Tx) ... $RFIC_N$ (Rx-Tx)) for the Tx/Rx paths in the RFIC pool (160)/allocates separate RFIC with tune away. Where N is the total number of RFIC and M is the total number of SIM (N<<M). Furthermore, as discussed above, one dedicated RFIC may be allocated for data transfer to the primary SIM and higher priority signaling may be serviced by the free pool of N−1 RFIC to M−1 SIMs. The RFIC allocated for the data transfer may be taken away to the higher priority signaling/services when the RFIC is/are not available in the free pool. Since the RFIC always has RX and TX, and some higher-priority signaling only uses RX, such as SIB read measurement, and paging block read, there is excessive resources are wasted on the TX path in the conventional RFIC configuration in the M-SIM UE.

At 410, shows the proposed RFIC configuration in the M-SIM UE (100) with multiple RFIC (e.g., RFIC $Rx_1$, RFIC $Tx_1$, RFIC $Rx_2$, RFIC $Tx_2$ ... RFIC $Rx_{N1}$, RFIC $Tx_{N2}$) for the Tx/Rx paths in the RFIC pool (160)/allocates separate RFIC with tune away. N1 is the total number of Rx-RFIC, N2 is the total number of Tx-RFIC and M is the total number of SIM (N2<N1<M). Furthermore, as discussed above, one dedicated RFIC may be allocated for data transfer to the primary SIM (150a) and higher priority signaling may be serviced by the free pool of N−1 RFIC to M−1 SIMs. The RFIC allocated for the data transfer may be taken away to the higher priority signaling/services when the RFIC is/are not available in the free pool. Since RFIC is are separate for the RX and TX and some higher priority signaling use only RX, such as SIB read measurement, and paging block read, only the corresponding number of RX RFIC will be activated and allocated for service, thereby saving power by not activating the rest of RX and TX RFICs.

Conventional devices for providing multi-SIM communication utilize mechanisms for allocating transmitting and receiving paths. However, the conventional devices do not dynamically enable or disable transmitting and/or receiving paths according to corresponding resource (e.g., PCR resources) costs. Accordingly, the conventional devices consume excessive amounts of resources (e.g., power, PCR wastage, data throughput, etc.).

However, according to an example embodiment, improved devices and methods are provided for multi-SIM communication. For example, the improved devices and methods may dynamically enable a number of paths (e.g., transmitting and/or receiving paths) according to corresponding resource (e.g., PCR resources, such as, PCR wastage, data throughput, etc.) costs, and/or dynamically disable remaining paths. Accordingly, the improved devices and methods overcome the deficiencies of the conventional devices to reduce resource consumption (e.g., power, PCR wastage, data throughput, etc.).

An example embodiment disclosed herein may be implemented using at least one hardware device and performing network management functions to control the elements.

The foregoing description of specific examples will so fully reveal the general nature of an example embodiment herein that others may, by applying current knowledge, readily modify and/or adapt for various applications such specific examples without departing from the generic concept, and, therefore, such adaptations and modifications should and are intended to be comprehended within the meaning and range of equivalents of an example embodiment. It is to be understood that the phraseology or terminology employed herein is for the purpose of description and not of limitation. Therefore, while an example embodiment herein have been described in terms of examples, those skilled in the art will recognize that the examples herein may be practiced with modification within the spirit and scope of an example embodiment as described herein.

We claim:

1. A method for determining a number of paths between a Radio Frequency Integrated Circuit (RFIC) and a plurality of Subscriber Identity Modules (SIMS) of a User Equipment (UE), the plurality of SIMS including a primary SIM and at least one secondary SIM, the method comprising:
    detecting, by the UE, at least one event associated with the at least one secondary SIM;
    determining, by the UE, a tune away duration associated with the primary SIM based on the at least one event associated with the at least one secondary SIM;
    determining, by the UE, an amount of resource loss by the primary SIM and a data throughput reduction of the primary SIM based on the tune away duration; and
    determining, by the UE, the number of the paths between the RFIC and the plurality of SIMS based on the amount of resource loss by the primary SIM and the data throughput reduction of the primary SIM, the paths being included in a free pool of the RFIC of the UE, each of the paths in the free pool being allocatable to any among the plurality of SIMS.

2. The method as claimed in claim 1, comprises:
    allocating, by the UE, a transmitting path and a receiving path to the primary SIM from among the paths in the free pool, the paths in the free pool including a plurality of transmitting paths and a plurality of receiving paths; and
    allocating, by the UE, at least one remaining transmitting path among the plurality of transmitting paths and at least one remaining receiving path among the plurality of receiving paths to the at least one secondary SIM.

3. The method as claimed in claim 1, wherein the at least one event includes a Paging reception (P), a Measurement (MES), a System Information Block (SIB), or a Signaling (SIG).

4. The method as claimed in claim 2, wherein the determining the tune away duration comprises:
    determining, by the UE, whether the at least one event includes a high-priority event; and
    performing, by the UE, one of:
        configuring the at least one remaining transmitting path and the at least one remaining receiving path for the at least one secondary SIM to determine the tune away duration in response to determining the at least one event includes the high-priority event, or
        configuring the at least one remaining receiving path for the at least one secondary SIM to determine the tune away duration in response to determining that the at least one event does not include the high-priority event.

5. The method as claimed in claim 4, wherein
    the at least one event includes a Paging reception (P), a Measurement (MES), a System Information Block (SIB), or a Signaling (SIG);
    the SIG is the high-priority event and uses an Uplink (UL) and a Downlink (DL) for message exchanges; and
    the P, the MES, and the SIB are not high-priority events and use the DL for message exchanges.

6. The method as claimed in claim 4, wherein the configuring the at least one remaining transmitting path and the at least one remaining receiving path comprises:
    determining, by the UE, whether the at least one remaining transmitting path and the at least one remaining receiving path are available to allocate to the at least one secondary SIM; and
    performing, by the UE, one of:
        allocating the transmitting path of the primary SIM to the at least one secondary SIM in response to determining the at least one remaining transmitting path is not available for the at least one secondary SIM,
        allocating the receiving path of the primary SIM to the at least one secondary SIM in response to determining the at least one remaining receiving path is not available for the at least one secondary SIM,
        allocating the at least one remaining transmitting path to the at least one secondary SIM in response to determining the at least one remaining transmitting path is available for the at least one secondary SIM, or
        allocating the at least one remaining receiving path to the at least one secondary SIM in response to determining the at least one remaining receiving path is available for the at least one secondary SIM.

7. The method as claimed in claim 4, wherein the configuring the at least one remaining receiving path for the at least one secondary SIM comprises:
    determining, by the UE, whether the at least one remaining receiving path is available to allocate to the at least one secondary SIM; and
    performing, by the UE, one of:
        allocating the receiving path of the primary SIM to the at least one secondary SIM in response to determining the at least one remaining receiving path is not available for the at least one secondary SIM, or
        allocating the at least one remaining receiving path to the at least one secondary SIM in response to determining the at least one remaining receiving path is available for the at least one secondary SIM.

8. The method as claimed in claim 1, wherein the determining the at least one event comprises:
    generating, by the UE, a page event for each of the plurality of SIMS at every DRX cycle period to read a page message at paging-subframe;
    generating, by the UE, a measurement event for each of the plurality of SIMS at the DRX Cycle period;
    generating, by the UE, an MES event for each of the plurality of SIMS;

performing, by the UE, a measurement at every DRX paging period in response to detecting a high speed of the UE;

generating, by the UE, SIB events for each of the plurality of SIMS at a periodic SIB reading timer expiry;

generating, by the UE, an SIB event at every cell boundary; or generating, by the UE, a SIG event at expiry of a periodic tracking area timer or in response to changing a tracking area.

9. The method as claimed in claim 1, wherein the method further comprises detecting a plurality of events for the plurality of SIMS, the plurality of events including the at least one event associated with the at least one secondary SIM and at least one event associated with the primary SIM; and the determining the amount of the resource loss by the primary SIM and the data throughput reduction of the primary SIM comprises:

determining, by the UE, whether a value of an event duration associated with each of the plurality of events is greater than a value of a physical link monitor timer; and performing, by the UE, one of:

determining the amount of resource loss by the primary SIM and the data throughput reduction of the primary SIM by analyzing the plurality of events for each Transmission Time Interval (TTI) based on a Physical Channel Resource (PCR) allocation rate and the event duration associated with each of the plurality of events in response to determining the value of the event duration associated with each of the plurality of events is not greater than the value of the physical link monitor timer, or determining the amount of resource loss by the primary SIM and the data throughput reduction of the primary SIM by analyzing the plurality of events for each TTI based on the PCR allocation rate and the value of the physical link monitor timer in response to determining the value of the event duration associated with each of the plurality of events is greater than the value of the physical link monitor timer.

10. The method as claimed in claim 9, further comprising:

determining, by the UE, a highest number of receiving paths and a highest number of transmitting paths for the at least one secondary SIM based on the amount of resource loss by the primary SIM and the data throughput reduction of the primary SIM, the highest number of receiving paths and the highest number of transmitting paths including values less than a threshold limit, the highest number of receiving paths corresponding to a plurality of receiving paths among the paths in the free pool, and the highest number of transmitting paths corresponding to a plurality of transmitting paths among the paths in the free pool.

11. The method as claimed in claim 1, wherein the method further comprises detecting a plurality of events for the plurality of SIMS, the plurality of events including the at least one event associated with the at least one secondary SIM and at least one event associated with the primary SIM, and the plurality of events corresponding to a plurality of transmitting paths and a plurality of receiving paths, the paths in the free pool including the plurality of transmitting paths and the plurality of receiving paths; and the determining the number of the paths between the RFIC and the plurality of SIMS comprises:

obtaining, by the UE, a number of transmitting paths and a number of receiving paths based on, a highest allowed PCR wastage combined with a first weight, and a highest allowed throughput degradation combined with a second weight, obtaining, by the UE, a combined metric of a respective amount of resource loss and a respective data throughput reduction for each combination of the plurality of transmitting paths and the plurality of receiving paths for at least one of the plurality of events, and determining, by the UE, the number of the paths based on the combined metric, the number of transmitting paths and the number of receiving paths, the number of the paths including one or more transmitting paths and one or more receiving paths, the one or more transmitting paths being among the plurality of transmitting paths, and the one or more receiving paths being among the plurality of receiving paths.

12. The method as claimed in claim 1, wherein the method further comprises detecting a plurality of events for the plurality of SIMS, the plurality of events including the at least one event associated with the at least one secondary SIM and at least one event associated with the primary SIM;

the at least one event associated with the primary SIM is active in a data session; and the at least one event associated with the at least one secondary SIM is at least one of an idle state, a periodic activity state, an aperiodic activity state, or a high-priority state to establish connectivity with at least one server.

13. A User Equipment (UE) for determining a number of paths between a Radio Frequency Integrated Circuit (RFIC) and a plurality of Subscriber Identity Modules (SIMS), the plurality of SIMS including a primary SIM and at least one secondary SIM, the UE comprising:

a memory; and processing circuitry, configured to:

detect at least one event associated with the at least one secondary SIM, determine a tune away duration associated with the primary SIM based on the at least one event associated with the at least one secondary SIM, determining an amount of resource loss by the primary SIM and a data throughput reduction of the primary SIM based on the tune away duration, and determine the number of the paths between the RFIC and the plurality of SIMS based on the amount of resource loss by the primary SIM and the data throughput reduction of the primary SIM, the paths being included in a free pool of the RFIC of the UE, each of the paths in the free pool being allocatable to any among the plurality of SIMS.

14. The UE as claimed in claim 13, wherein the processing circuitry is configured to:

allocate a transmitting path and a receiving path to the primary SIM from among the paths in the free pool, the paths in the free pool including a plurality of transmitting paths and a plurality of receiving paths; and allocate at least one remaining transmitting path among the plurality of transmitting paths and at least one remaining receiving path among the plurality of receiving paths to the at least one secondary SIM.

15. The UE as claimed in claim 13, wherein the at least one event includes a Paging reception (P), a Measurement (MES), a System Information Block (SIB), or a Signaling (SIG).

16. The UE as claimed in claim 14, wherein the processing circuitry is configured to determine the tune away duration including:
   determining whether the at least one event includes a high-priority event; and
   performing one of:
      configuring the at least one remaining transmitting path and the at least one remaining receiving path for the at least one secondary SIM to determine the tune away duration in response to the at least one event includes the high-priority event, or
      configuring the at least one remaining receiving path for the at least one secondary SIM to determine the tune away duration in response to determining the at least one event does not include the high-priority event.

17. The UE as claimed in claim 16, wherein
   the at least one event includes a Paging reception (P), a Measurement (MES), a System Information Block (SIB), or a Signaling (SIG);
   the SIG is the high-priority event and uses an Uplink (UL) and a Downlink (DL) for message exchanges; and
   the P, the MES, and the SIB are not high-priority events and use the DL for message exchanges.

18. The UE as claimed in claim 16, wherein the configuring the at least one remaining transmitting path and the at least one remaining receiving path comprises:
   determining whether the at least one remaining transmitting path and the at least one remaining receiving path are available to allocate to the at least one secondary SIM; and
   performing one of:
      allocating the transmitting path of the primary SIM to the at least one secondary SIM in response to determining the at least one remaining transmitting path is not available for the at least one secondary SIM,
      allocating the receiving path of the primary SIM to the at least one secondary SIM in response to determining the at least one remaining receiving path is not available for the at least one secondary SIM,
      allocating the at least one remaining transmitting path to the at least one secondary SIM in response to determining the at least one remaining transmitting path is available for the at least one secondary SIM, or
      allocating the at least one remaining receiving path to the at least one secondary SIM in response to determining the at least one remaining receiving path is available for the at least one secondary SIM.

19. The UE as claimed in claim 16, wherein the configuring the at least one remaining receiving path for the at least one secondary SIM comprises:
   determining whether the at least one remaining receiving path is available to allocate to the at least one secondary SIM; and
   performing one of:
      allocating the receiving path of the primary SIM to the at least one secondary SIM in response to determining the at least one remaining receiving path is not available for the at least one secondary SIM, or
      allocating the at least one remaining receiving path to the at least one secondary SIM in response to determining the at least one remaining receiving path is available for the at least one secondary SIM.

20. The UE as claimed in claim 13, wherein the processing circuitry is configured to determine the at least one event, including:
   generating a page event for each of the plurality of SIMS at every DRX cycle period to read a page message at paging-subframe;
   generating a measurement event for each of the plurality of SIMS at the DRX Cycle period;
   generating an MES event for each of the plurality of SIMS;
   performing a measurement at every DRX paging period in response to detecting a high speed of the UE;
   generating SIB events for each of the plurality of SIMS at a periodic SIB reading timer expiry;
   generating an SIB event at every cell boundary; or
   generating a SIG event at expiry of a periodic tracking area timer or in response to changing a tracking area.

* * * * *